Sept. 11, 1951 W. O. BLAKE 2,567,542
BATTERY BREAKING MACHINE
Filed Sept. 29, 1949 5 Sheets-Sheet 1
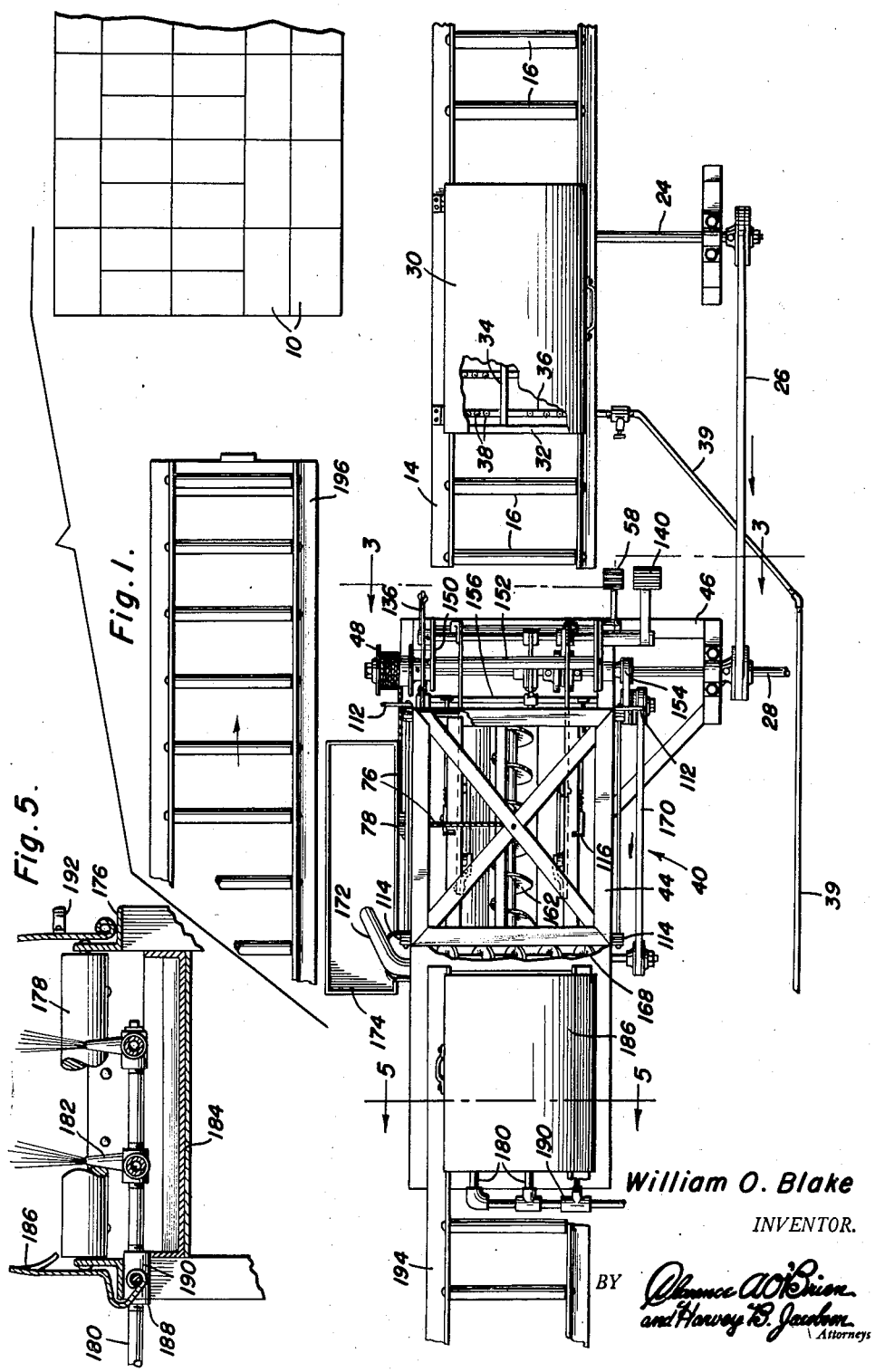
William O. Blake
INVENTOR.

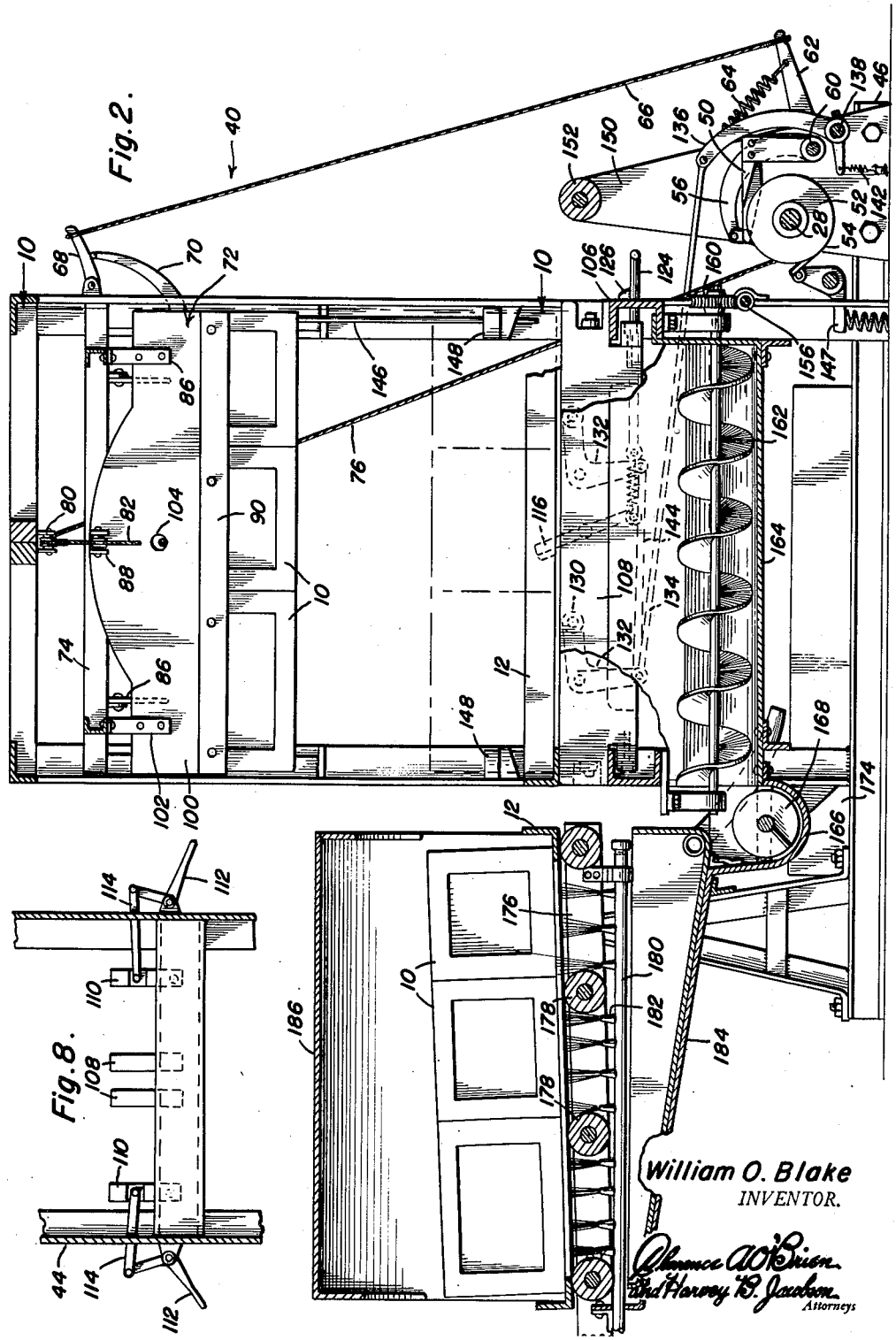

Sept. 11, 1951  W. O. BLAKE  2,567,542
BATTERY BREAKING MACHINE
Filed Sept. 29, 1949  5 Sheets-Sheet 3
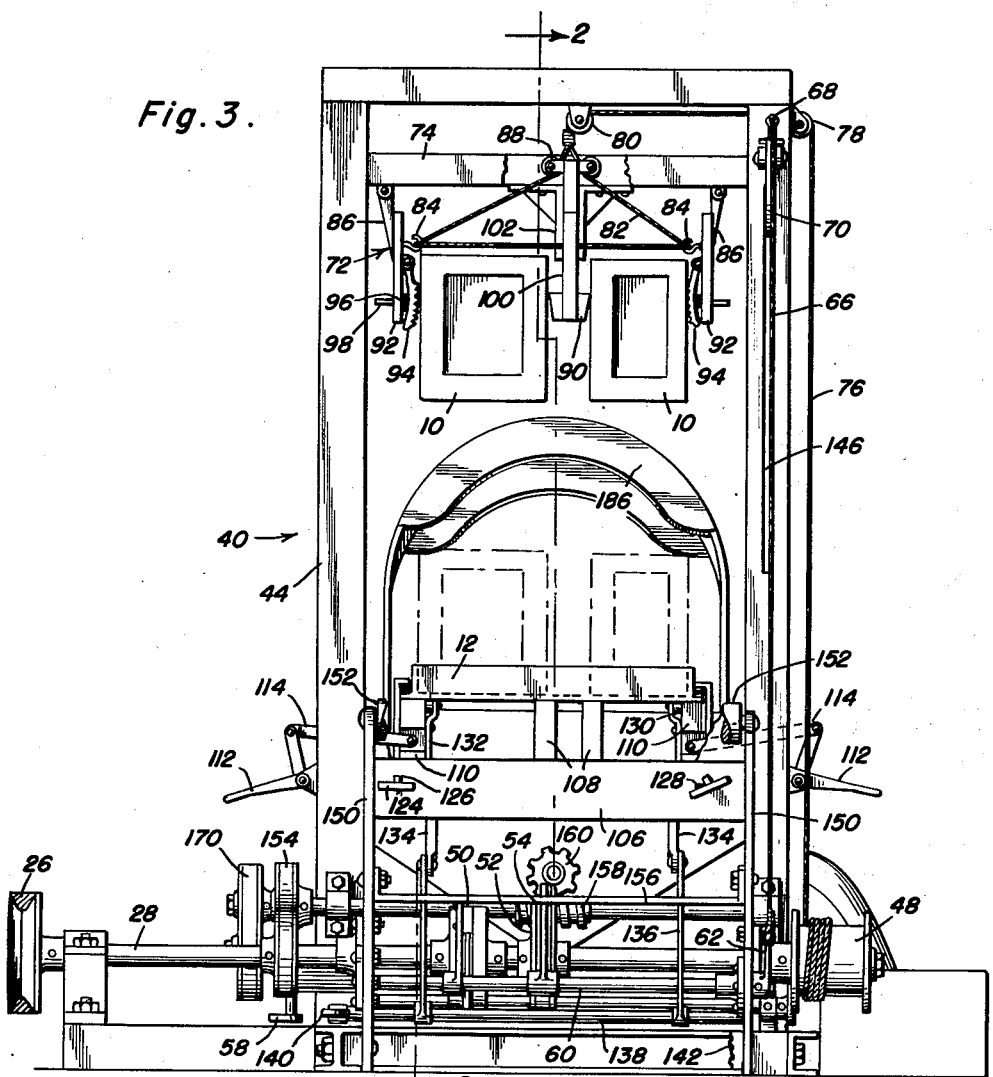
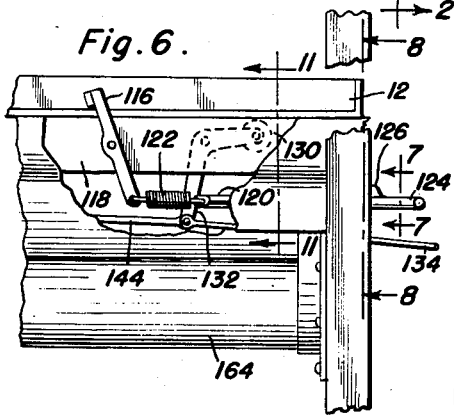
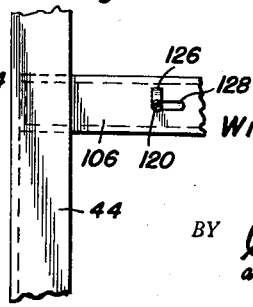
William O. Blake
INVENTOR.

Sept. 11, 1951
W. O. BLAKE
2,567,542
BATTERY BREAKING MACHINE
Filed Sept. 29, 1949
5 Sheets-Sheet 4
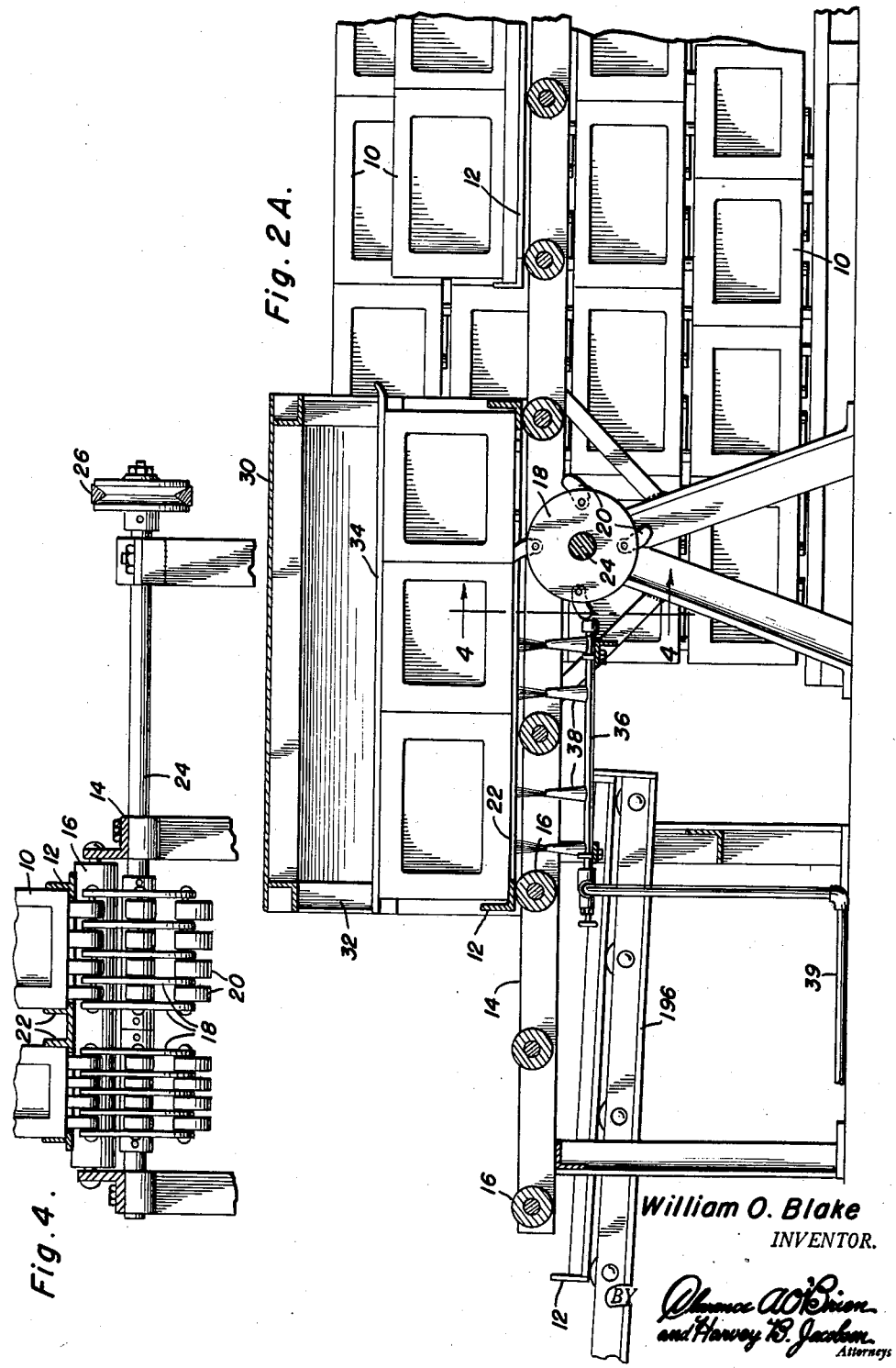
William O. Blake
INVENTOR.

Sept. 11, 1951  W. O. BLAKE  2,567,542
BATTERY BREAKING MACHINE
Filed Sept. 29, 1949  5 Sheets-Sheet 5
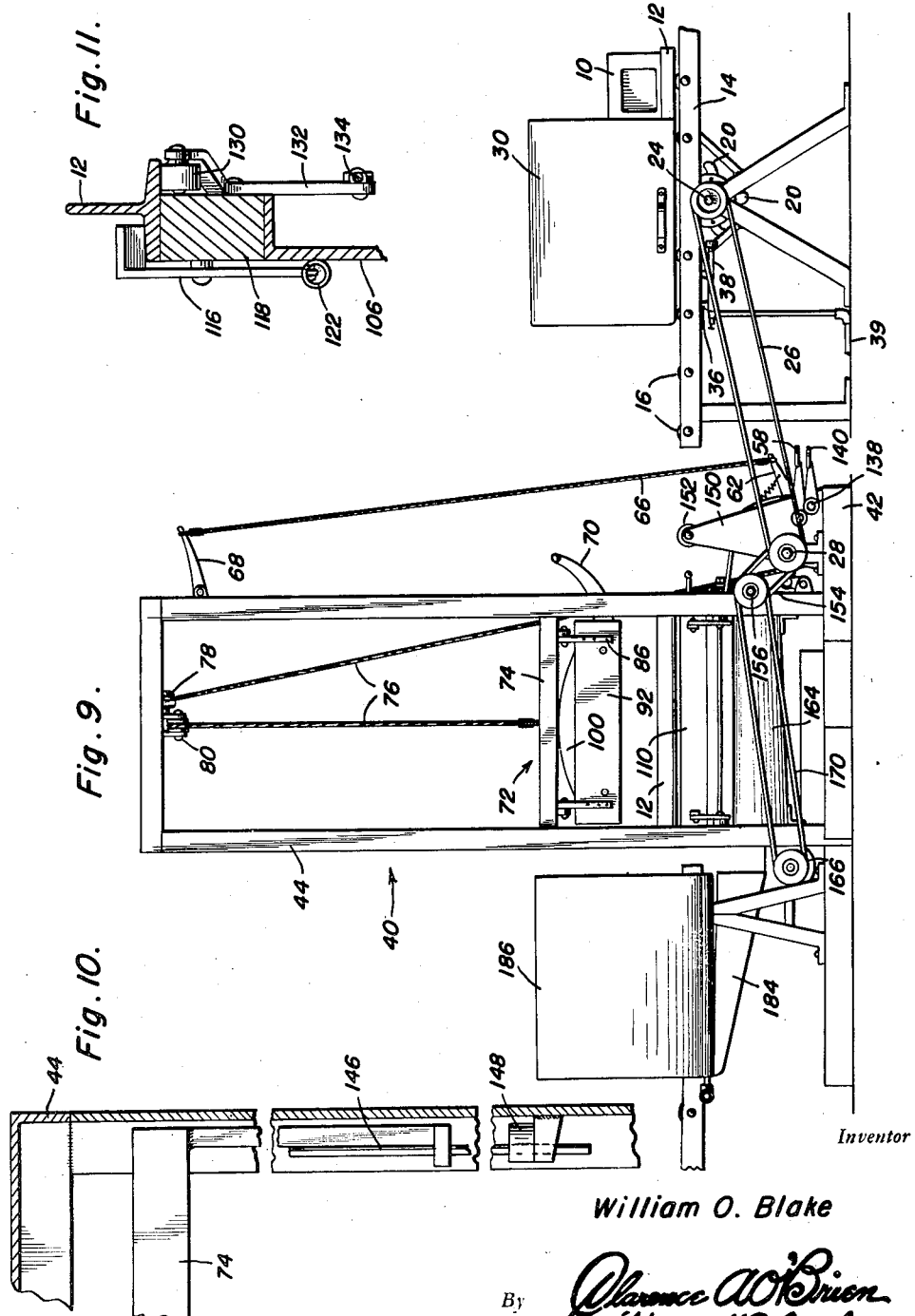
Inventor
William O. Blake
By Clarence A. O'Brien
and Harvey B. Jacobson
Attorneys Patented Sept. 11, 1951

2,567,542

UNITED STATES PATENT OFFICE 2,567,542

BATTERY BREAKING MACHINE

William O. Blake, Seattle, Wash.

Application September 29, 1949, Serial No. 118,656

7 Claims. (Cl. 136—176)

This invention relates to a machine for processing salvage batteries and recovering the lead and casings therefrom.

The primary object of this invention is to facilitate and expedite both the handling of the batteries and the actual operation of extracting the lead cores from the batteries.

Another object of this invention, ancillary to the preceding object, is to provide a machine which can be operated under agreeable conditions from the viewpoint of the men actually handling the batteries and the machine and the salvage products.

Another important object of this invention is to provide a machine in which a number of individual batteries can be grouped together and processed as a group, even when the individual batteries in a group vary slightly in size.

A specific object, relating to the immediately preceding object, is to provide conveyor means upon which a rack can be easily shifted from one station to the succeeding station in the machine, there being different processing operations carried out at the different stations, and an important feature of this invention is the use of the said rack as a member against which the batteries fall under the action of gravity in what is hereinafter referred to as the separator, this last feature making it possible for the easy replacement of a portion of the machine which is likely to require replacement most frequently, as well as to provide for a perfectly adapted member to arrest the falling batteries and to retain the casings, still as a group, for movement through a portion of the machine hereinafter referred to as the casing washer.

Yet another object of this invention, relating to the provision of the above mentioned rack, is the provision of means in the said separator for locking the rack in position to receive the falling batteries, the separator having still other means to facilitate the removal of the rack with the empty casings thereon.

An object of this invention, equal in its importance to any of the preceding objects, is the teaching of a method and the means for carrying out a method of recovering lead and casings from salvage batteries comprising, in brief, the breaking of the seal and the washing of the batteries as an initial step, the batteries being carried in a rack as a group and in inverted position, whereafter the unsealed batteries are processed in a separator, wherein certain of the minor steps in the method may not be novel and the corresponding elements not completely new although the adaptation of the separator for use with a rack and certain other important details are new, and finally, the removal of the batteries casings as a group, still in the same rack and the washing of the empty casings.

A last object to be mentioned specifically is to provide a method and means for recovering the lead and casings from salvage batteries, which method and means are relatively inexpensive and practicable, safe and generally efficient.

With these and other objects which will occur to those skilled in the art in view, this invention resides in the construction, arrangement and organization of the elements and steps hereinafter referred to in detail in the specification, illustrated in the drawings, and referred to particularly in the appended claims, the single embodiment of this invention represented in the drawings being thought of as illustrative rather than limiting, and the different figures in the drawings representing different portions of the machine, as follows:

Figure 1 is a grouped view showing the machine in plan, certain portions of the machine being shown fragmentarily, and this figure includes representation of a pile of salvage batteries in order to indicate graphically how this machine may be set up and placed in operation;

Figures 2 and 2A represent collectively substantially the same structure as shown in Figure 1, these figures being vertical, sectional views taken substantially on a section line through the center of the separator and adjacent structure;

Figure 3 is an end elevational view of the separator, taken from the line 3—3 in Figure 1;

Figure 4 is an enlarged fragmentary view of the rotary hammer assembly and adjacent structure, the view being taken substantially on the line 4—4 in Figure 2A;

Figure 5 is an enlarged fragmentary sectional view taken on the line 5—5 in Figure 1;

Figure 6 is an enlarged fragmentary view, side elevational in character, of a lower portion of the separator;

Figure 7 is an enlarged view, taken substantially on the line 7—7 in Figure 6;

Figure 8 is a similar view taken on the line 8—8 in Figure 6;

Figure 9 is a side elevational view of the assembled machine;

Figure 10 is an enlarged fragmentary vertical sectional view, taken on the line 10—10 in Figure 2; and Figure 11 is an enlarged fragmentary vertical sectional view, taken substantially on the line 11—11 in Figure 6 and designed to show the main elements used in locking the rack within the separator and the roller assembly used for facilitating the rolling of the rack out of the separator toward the casing washer.

Similar characters of reference designate similar or identical elements and portions throughout the specification and throughout the different views of the drawings.

Referring now to the drawings in detail, this invention is adapted to be used with an environment including a plurality of batteries which need not necessarily be of equal size or shape, these batteries being identified by the numerals 10. A plurality of these batteries are placed in two rows upon a rack 12, as best illustrated in Figures 2A and 3, this rack being an elongated flat bottomed tray of open frame character, and the rack with its batteries is slid along the conveyor 14 which is equipped with transverse rollers 16 and freely rotatably mounted. The batteries are placed in the rack 12 in inverted position and these batteries remain in this inverted position throughout the processing thereof in the machine. The rack with its load of inverted batteries is pushed along the conveyor 14, as best illustrated in Figure 2A and a rotary hammer having a plurality of discs 18 and a greater plurality of centrifugal hammers 20 pivotally mounted to and between the discs 18. It should be here noted that the rack 12 is conveniently constructed from angle iron and will include upstanding flanges 22 extending longitudinally of the rack and ordinarily dividing the rack unequally into portions of unequal width, to receive batteries of different sizes, although in installations where the batteries will be of uniform size, the rack may be correspondingly fabricated. In any event, the upstanding flanges comprise abutment for the adjacent sides of the batteries in the two rows of batteries on the rack, as clearly indicated in Figure 4, and the centrifugal hammers 20 with their supporting discs 18 will be grouped into two groups on each side of the upstanding flanges 22. The rotary hammer assembly is equipped with a drive shaft 24 which may be journaled in part on the conveyor 14 and this drive shaft is driven by a belt 26 and a complement of pulleys connecting the same with a power driven shaft 28, the source of power being thought unnecessary to be illustrated in the drawings.

The arrangement of elements described above is effective in breaking and loosening the sealing material in the tops of the inverted batteries in the rack 12 and the next step is the washing of the electrolyte from the unsealed batteries. A canopy-like shield 30 is mounted upon the conveyor 14, as best indicated in Figures 1 and 2A, to cover a portion of the conveyor equipped with water pipes 36 having jets 38 and connected to a source of pressurized water diagrammatically indicated at 39, these jets being adapted to direct a forceful spray of water upwardly into the unsealed batteries to wash the electrolyte therefrom. The shield 30 is supported on a frame 32 which is preferably equipped with a longitudinally extending rib structure 34 arranged in substantially vertical alignment with the upstanding flange 24 of the rack 12, and the jets 38 will be disposed so as to direct water forcefully against the exposed core portions of the batteries while the same are being passed beneath the shield 30.

The separator comprises a main portion of the machine and includes a base 42 and a vertical frame 44, the separator being indicated as a whole by the numeral 40. The base has a projecting portion 46 upon which are operatively mounted a considerable number of elements including the drive shaft 28 and the reel 48 on the end of this drive shaft, a clutch mechanism 50 on an intermediate portion of this drive shaft, the drive shaft being divided, of course, and a brake drum 52 with a brake band 54 are operatively mounted to control the rotation of the section of the drive shaft 28 adjacent the reel 48. The specific character of the clutch and brake mechanism may be varied considerably without departing from the spirit of this invention and these assemblies are somewhat diagrammatically illustrated, the brake band 54 being indicated as operated by an arm 56, illustrated in Figure 2, and a foot lever 58 connected to the arm by a shaft 60. An arm 62 is rigidly secured to the shaft 60, preferably adjacent the reel 48, and the arm 62 and parts connected thereto are biased to move in one direction by the spring 64, best represented in Figure 2. A cable 66 is secured to and between the arm 62 and another arm 68 pivoted on an upper portion of the frame 44, and it will be clear how this arm 68 is operated by a laterally extending arm 70 which is carried by the carriage generally indicated at 72, when this carriage is at its upper limit of travel within the vertical frame 44.

As indicated in the preceding paragraph, the carriage 72 is vertically reciprocally mounted within the frame 44, the drawings representing a carriage which is generally rectangular in shape and guided by the corner members of the vertical frame 44 which may conveniently be of angle iron stock, the upper frame portion 74 of the carriage being dimensioned and shaped to fit reasonably snugly within the vertical frame 44. A second cable 76 has one end wound upon the reel 48 and an intermediate portion of this second cable is led through the pulleys 78 and 80 at the top of the frame 44. This cable 76 is provided with a loop 82, the branches of which are entrained through guide members 84 which may be simple eye members as represented in Figure 3 or pulleys, or the like, mounted upon a pair of opposing jaw assemblies 86, while the ends of the branches of the loop 82 are entrained through pulleys 88 mounted on the frame member 74 of the carriage. The carriage will include a major member 90 ordinarily disposed slightly to one side of the medial line of the carriage to correspond with the positioning of the vertical flanges 22 in the rack 12. The jaw assemblies will each include a member 92 of plate character and a battery engaging jaw pivotally mounted on the member 92. A spring 96 will be compressed between the depending member 92 and the jaw 94 and arranged coaxially of a supporting pin 98, so that small variations in the size of batteries will not prevent the corresponding jaws from gripping the same tightly, it being understood that the jaws 94 urge the batteries 10 toward each other and into engagement with the spacer member 90. In this connection, it will be noted that the spacer member 90 may be of elongated form and will be mounted upon a depending plate 100 carried by brackets 102, and the plate 100 will have an aperture 104 to accommodate a central portion of the loop 82 of the cable previously mentioned as being used to raise and lower the carriage.

The vertical frame 44 of the separator is provided with a transverse member 106 of plate character and supports fixed bars 108 and parallel relatively shiftable bars 110, the fixed bars 108 corresponding generally as to length and positioning with the base portions of the upstanding flanges 22 in the rack 12, when this rack is moved into the separator 40, as will be clearly understood from an inspection of Figure 3, while the shiftable bars 110 are slidable toward and away from the fixed bars 108 so as to register reasonably accurately with the bases of lateral angle iron members on the rack 12, when this rack is in position within the separator. The bars 110 are shifted by handles 112 which constitute bell cranks and which are connected to the bars 110 by inflexible links 114, the handles 112 being pivoted on side members of the vertical frame 44.

There is provided means to hold the rack 12 in fixed position on the bars 108 and 110, while the batteries 10 are being raised by the carriage 72, this means including levers 116 having portions to engage the sides of the rack 12. The levers 116 are pivoted on a transverse member 118 of the frame 44 and inflexible push rods 120 are connected to the levers 116 by coiled springs 122, while outer end portions of the push rods 120 are provided with handles 124 and lugs 126. When handles 124 are turned slightly about the axis of the push rods 120, the lugs 128 are allowed to enter slots 128, thus allowing the push rods to release the levers 116 from engagement with the rack 12, but when the handles are pulled outwardly and the lugs 126 engage the outer surface of the transverse member 118, the upper portions of the levers 116 tightly engage the rack 12 and hold the same fixedly upon the bars 108 and 110.

Means to facilitate the movement of the loaded rack into the separator and from the separator are provided in this invention and include rollers 130 on angle arms 132 pivoted on the transverse members 118, at two sides of the machine, the push rods 134 being used to connect the angle arms 132 with levers 136, these levers 136 being rigidly secured on a shaft 138 and operated by a pedal member 140. The shaft 138 is biased to rotate in one direction by a spring 142, and it will be understood that further link members 144 will be used to connect operatively other oppositely disposed assemblies of similar rollers 130 and angle arms 132, so that at least four such roller assemblies will be simultaneously operated to lift the rack 12 out of engagement with the bars 108, 110 when it is desired to move the rack into and out of the separator.

The carriage 72 is provided with at least one depending push rod 146 designed so that its lower end operates a bell crank member 147 pivotally secured to one end of the brake band 54 so that the brake drum 52 and the reel 48 are braked sharply when the carriage reaches the lower extremity of its travel. Furthermore, in order to prevent undue vibration and injury to the carriage, rubber bumpers 148 are mounted in suitably positioned portions of the vertical frame 44 to engage lower end portions of the carriage 72 at the bottom of its travel.

The extending portion 46 of the base of the separator includes a pair of upstanding base plate supports 150 which have rotatably mounted thereon at their upper ends a simple roller 152, this roller comprising essentially, an extension of the conveyor 144 to facilitate the movement of the rack 12, laden with batteries, from the conveyor 14 into the separator.

A belt 154 and a suitable complement of pulleys connect the drive shaft 28 with a drive shaft 156 having a worm gear 158 enmeshed with a gear 160 to drive a spiral conveyor 162 extending to what may be considered the rear of the machine. This spiral conveyor 162 operates within the lower arcuate portion of a hopper 164 rigidly mounted upon the vertical frame 44, this hopper leading into chute 166 extending transversely of the hopper 164 and having a second spiral conveyor 168 driven by a suitable complement of pulleys and a belt 170 entrained over a pulley on the shaft 156. The conveyor 168 has an outlet 172 into a trough 174, wherein the material of the cores of the batteries and water from the battery casing washer will be deposited.

Referring now to this battery casing washer, it should first be noted that the battery casings are removed as a group within the rack 12, from the position thereof within the separator into the casing washer. In this washer supporting beam members 176, corresponding generally with the side members of the conveyor 14, support a plurality of transverse freely rotatably mounted rollers 178 and pipes 180 with jets 182, connected to a suitable source of water under pressure, play forceful streams of water upwardly into the inverted empty battery casings. A sloping floored hopper 184 collects the flush water and sludge from the batteries and directs this material into the conveyor 168. A feature of the casing washer is the provision of a shield 186 which is hinged as indicated at 188 at one side of the washer, the hinge construction being operatively connected with a valve 190 controlling flow of water into the washer from the pipe system 180. This arrangement allows the operator to initiate the flow of the flushing water immediately upon the depression of the shield 186 into the position indicated in the figures, a handle 192 being provided on the shield 186 to facilitate the manipulation thereof. It will be noted that a section of the conveyor 14 leads from the casing washer, as indicated at 194 and 196, preferably in a returned path leading toward the stock of salvage batteries 10, as indicated in Figure 1, so that the rack 12 will be returned for re-use.

The operation of this invention and the method and steps will be clearly understood from a consideration of the foregoing description of this invention and further description of the mechanical details or the method would appear to be unnecessary.

Having described the invention, what is claimed as new is:

1. A machine for recovering the lead and casings from salvage batteries comprising an open frame rack to receive a plurality of batteries, rotary hammers operatively mounted below said frame rack to remove the sealing material from the tops of the batteries carried by said rack, fluid jet means located adjacent said rack and in advance of said hammers to wash the electrolyte from the batteries while supported on the rack, a separator including a carriage disposed adjacent to said rack to raise the batteries, trip means operatively connected with said carriage to drop the batteries in inverted position, bars supporting said rack, said rack comprising means to arrest the casings of the dropped batteries, whereby the cores of the batteries are separated from the casings by gravity, a conveyor for the cores, and a washer for empty casings.

2. A machine according to claim 1 and including a conveyor along which said rack with its complement of batteries travels from the rotary hammer to the separator.

3. A machine according to claim 1 and wherein said separator has a vertical frame, said carriage being vertically slidably mounted in the frame and having oppositely disposed pivoted jaw assemblies each depending members and jaws pivoted thereon, a reel and cable operatively mounted on said frame to raise said carriage, said jaw assemblies having guide means engaged by said cable to close said jaws into battery engaging position.

4. A machine according to claim 1 and wherein said separator has a vertical frame, said carriage being vertically slidably mounted in the frame and having oppositely disposed pivoted jaw assemblies each depending members and jaws pivoted thereon, a reel and cable operatively mounted on said frame to raise said carriage, said jaw assemblies having guide means engaged by said cable to close said jaws into battery engaging position, and manually operated jaw locking means to hold said jaws in batteries engaging position when the cable is slackened.

5. A machine according to claim 1 and including a conveyor leading over said rotary hammer to said separator, said rack being elongated and shiftable along said conveyor, so that said batteries are successively operated upon by said hammer while supported in inverted position within said rack.

6. A machine according to claim 1 and including rollers adjacent said bars, and means to raise and lower said rollers into and out of engagement with said rack to facilitate movement of the rack with its complement of batteries into the separator and movement of the rack with its empty casings out of said separator.

7. A machine according to claim 1 and including rollers adjacent said bars, and means to raise and lower said rollers into and out of engagement with said rack to facilitate movement of the rack with its complement of batteries into the separator and movement of the rack with its empty casings out of said separator, and means to lock said rack on said bars when the rollers are depressed.

WILLIAM O. BLAKE.

REFERENCES CITED

The following references are of record in the file of this patent:

UNITED STATES PATENTS

| Number | Name | Date |
|---|---|---|
| 976,703 | Seberg et al. | Nov. 22, 1910 |
| 2,119,857 | Eppensteiner | June 7, 1938 |
| 2,119,858 | Eppensteiner | June 7, 1938 |
| 2,250,490 | Lormor | June 29, 1941 |
| 2,380,329 | Price | July 10, 1945 |
| 2,457,519 | Bemel | Dec. 28, 1948 |